No. 896,465. PATENTED AUG. 18, 1908.
W. E. ROSEN.
LOCK NUT.
APPLICATION FILED MAR. 23, 1907.

Inventor
Walton E. Rosen

Witnesses

By Geo. S. Vashon
Attorney

UNITED STATES PATENT OFFICE.

WALTON E. ROSEN, OF NEW ROSS, INDIANA.

LOCK-NUT.

No. 896,465.          Specification of Letters Patent.          Patented Aug. 18, 1908.

Application filed March 23, 1907. Serial No. 364,013.

*To all whom it may concern:*

Be it known that I, WALTON E. ROSEN, a citizen of the United States, residing at New Ross, in the county of Montgomery and State of Indiana, have invented new and useful Improvements in Lock-Nuts, of which the following is a specification.

This invention relates to bolt holding nuts, being especially directed to means for locking the nuts in applied position and has for its objects to provide a comparatively simple, inexpensive device of this character, whereby the nut may be readily and securely locked at any desired place on the bolt, one which may be conveniently manipulated for locking or releasing the nut, and one which in practice may be operated without injury to the threads of either the nut or bolt.

With these and other objects in view, the invention comprises the novel features of construction and combination of parts more fully hereinafter described.

Figure 1:
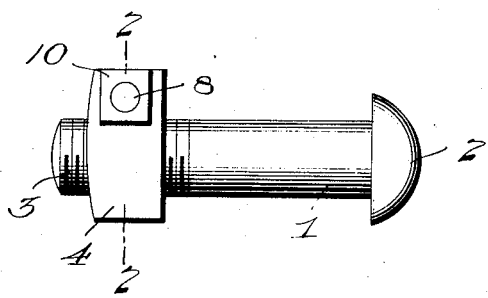
Figure 2:
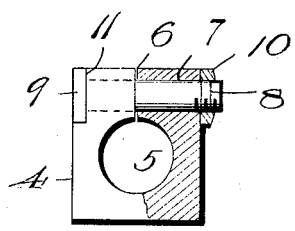
Figure 3:
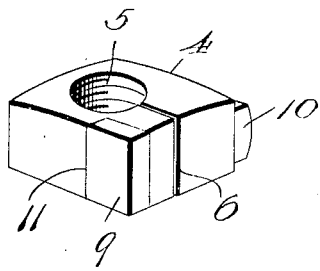

In the accompanying drawings, Figure 1 is a side elevation of a bolt having a nut applied thereto and locked in accordance with the invention. Fig. 2 is a face view of the nut partly in section, the section being taken on the line 2—2, of Fig. 1. Fig. 3 is a perspective view of the nut removed from the bolt.

Referring to the drawings, 1 designates a bolt provided as usual with a head 2 and having a threaded portion 3 to receive the nut 4 which in turn is provided with an internally threaded bolt receiving opening 5, these parts, except as hereinafter explained, being of usual construction and material and adapted in practice to perform their ordinary functions.

In accordance with the invention the nut 4 is split at one side of the opening 5 by means of a slot or incision 6, while formed transversely through the nut in a plane at right angles to and intersecting the incision 6 is an opening or bore 7 adapted to receive a locking member or bolt 8 provided at one end with a head 9 and having its other end threaded to receive a retaining nut or tap 10, there being formed in one edge of the nut 4 in line with the bore 7 a recess 11 of size to receive the head 9 of the locking bolt.

When the head 9 of the locking bolt is fully fitted within the recess 11, the sides of the said head are flush with the adjacent sides of the nut, so as to avoid any objectionable projections, the said recess also serving to hold the head of the bolt against movement when adjusting the nut 10 thereof.

In practice, the tap 10 normally remains in sufficiently loosened condition to preserve the true circular form of the bolt receiving opening 5, thereby permitting free application of the nut to, and its ready adjustment upon, the threaded portion of the bolt. After proper adjustment of the nut has been effected it may be quickly locked in such position by tightening the tap 10, thereby compressing the portions of the nut at opposite sides of the incision 6 toward each other, thus reducing the size of the opening 5 and fixedly clamping the nut in place on the bolt, it being understood that the material of the nut possesses sufficient natural springiness to permit of this action. It is to be observed that owing to the nut 4 being recessed to receive the head of the locking bolt 8 the latter will be securely held against rotation while the tap 10 is being tightened for locking the nut and further that the tap, which bears on one of the flat edge faces of the nut, is readily accessible for engagement by a wrench or other operating tool, thereby rendering the lock convenient to manipulate. Also, under the improved form of lock, the nut may be made of ordinary contour and is free from projections, whereby, not only may a wrench of common form be employed for applying the nut to the bolt, but liability of the nut being damaged in use is reduced to a minimum.

What I claim is:

A nut lock comprising a nut having a threaded bolt-receiving opening, one wall of which is radially cleft, the said opening having the threads thereof uninterrupted from one wall of the cleft to the other, one corner of the nut being provided with a rectangular recess to form a seat and with a transverse orifice intercepting the cleft, a clamping bolt arranged in the said orifice and having a head to snugly fit in the seat, and having its sides flush with the adjacent side of the nut, and a nut removably and adjustably engaging the clamping bolt, the first mentioned nut having an angular perimeter, and the head of the clamping bolt, as well as the nut of the latter, being within the distance between at least two of the sides of the said first mentioned nut to permit said sides to be engaged by a wrench or like implement.

In testimony whereof, I affix my signature in presence of two witnesses.

WALTON E. ROSEN.

Witnesses:
H. D. SHEWEY,
FRANK KENNEDY.